United States Patent
Tan

(10) Patent No.: US 11,984,808 B2
(45) Date of Patent: May 14, 2024

(54) SELF-TUNING REGULATOR FOR INTERLEAVED POWER FACTOR CORRECTION CIRCUITS AND METHOD OF SELF-TUNING REGULATION

(71) Applicant: Murata Manufacturing Co., Ltd., Nagaokakyo (JP)

(72) Inventor: Longcheng Tan, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 168 days.

(21) Appl. No.: 17/440,490

(22) PCT Filed: Mar. 9, 2020

(86) PCT No.: PCT/US2020/021641
§ 371 (c)(1),
(2) Date: Sep. 17, 2021

(87) PCT Pub. No.: WO2020/205167
PCT Pub. Date: Oct. 8, 2020

(65) Prior Publication Data
US 2022/0158545 A1    May 19, 2022

Related U.S. Application Data

(60) Provisional application No. 62/704,062, filed on Mar. 29, 2019.

(51) Int. Cl.
H02M 3/158    (2006.01)
H02M 1/00     (2006.01)
H02M 1/42     (2007.01)

(52) U.S. Cl.
CPC ....... *H02M 3/1586* (2021.05); *H02M 1/0009* (2021.05); *H02M 1/4225* (2013.01)

(58) Field of Classification Search
CPC ............ H02M 1/0009; H02M 3/1586; H02M 1/4225; H02M 3/1584
See application file for complete search history.

(56) References Cited

U.S. PATENT DOCUMENTS 7,116,087 B2    10/2006  Zhang et al.
9,923,455 B2    3/2018   Gong et al.
(Continued)

FOREIGN PATENT DOCUMENTS

CN       101594049 B      6/2012
KR    10-2018-0136268 A   12/2018

OTHER PUBLICATIONS

Official Communication issued in International Patent Application No. PCT/US2020/021641, dated Jul. 2, 2020.

*Primary Examiner* — Alex Torres-Rivera
(74) *Attorney, Agent, or Firm* — Keating & Bennett, LLP

(57) ABSTRACT

A regulator for an interleaved power factor correction circuit to enhance current sharing performance includes adjuster circuitry that determines a duty cycle adjustment; judge circuitry that determines whether to activate the adjuster circuitry; distributor circuitry that determines tuned duty cycles based on input duty cycles and the duty cycle adjustment; and tuner circuitry that determines tuned average inductor currents in first and second phases of the interleaved power factor correction circuit based on the tuned duty cycles.

12 Claims, 7 Drawing Sheets

(56) References Cited

U.S. PATENT DOCUMENTS

| | | |
|---|---|---|
| 2007/0253223 A1 | 11/2007 | Neidorff et al. |
| 2009/0257257 A1 | 10/2009 | Adragna et al. |
| 2012/0078556 A1* | 3/2012 | Holmberg ............. H02M 3/156 |
| | | 702/64 |
| 2012/0250363 A1 | 10/2012 | Skinner |
| 2013/0194848 A1 | 8/2013 | Bernardinis et al. |
| 2014/0169049 A1 | 6/2014 | Chandrasekaran |
| 2015/0349636 A1* | 12/2015 | Bodano ................... H02M 1/32 |
| | | 323/271 |

\* cited by examiner

SELF-TUNING REGULATOR FOR INTERLEAVED POWER FACTOR CORRECTION CIRCUITS AND METHOD OF SELF-TUNING REGULATION

BACKGROUND OF THE INVENTION

1. Field of the Invention

The present invention relates to self-tuning regulators for interleaved power factor correction (PFC) circuits and devices. More specifically, the present invention relates to self-tuning regulators that counteract inaccuracy and characteristic drift of sampling circuits to enhance current sharing performance in PFC circuits.

2. Description of the Related Art

For interleaved PFC, current sharing is achieved by controlling each average inductor current to follow a common reference current. Under light-load conditions where discontinuous and boundary conduction modes occur, average inductor currents are calculated through multiplications of sampled currents and duty cycles with proper coefficients. When sampling circuits are inaccurate, current sharing controllers regulate duty cycles incorrectly or inaccurately so that calculated average inductor currents follow their reference currents, but actual inductor currents remain unbalanced. This condition results in large input current ripples and severe noise at some operating points, especially when the input voltage is direct current (DC).

Because of different characteristic variations, drifts, and resolution issues of sampling circuits in different PFC circuits, it is impossible to eliminate these detrimental influences on current sharing performance by a fixed hardware or firmware compensation solution.

A current-sensing and gain-switching circuit is proposed in Bing et al. (U.S. Pat. No. 9,923,455) to improve current sampling resolution and accuracy under light-load conditions for a PFC circuit by changing sampling gain-amplifiers to increase the resolution when load conditions change from heavy to light. However, this technique requires changing sampling resistors in hardware and changing control gains in firmware when the load condition changes.

Another solution is proposed in Yan (CN 101594049B) to periodically and alternatively change driving signals to an interleaved PFC circuit to achieve current balancing. However, this method can only passively balance currents. If parameters of sampling circuits, power circuits, or driving circuits are not symmetrical, this method cannot actively balance the currents well.

Gabriele et al. (U.S. Pat. No. 9,077,243) achieves current sharing through a common parameter to all phases, which de-multiplexes the common signal into two separate inductor currents by a phase-select signal and a plurality of digital signals. However, the accuracy of separate inductor currents indirectly obtained through de-multiplexing cannot be guaranteed, especially when duty cycles are larger than 0.5 under discontinuous conduction mode, which implies the currents could be unbalanced under such condition.

The current sharing method for an interleaved PFC circuit of Qiongyou et al. (U.S. Pat. No. 7,116,087) is achieved by controlling two sampled inductor currents to the same reference current directly through two integrated circuit chips (UC3845), but this technique does not address sampling inaccuracy or characteristic drifts of sampling circuits and does not address discontinuous conduction mode. Thus, the currents can still be unbalanced under light-load conditions, even though two separate current controllers are used.

Current sharing in Neidorff et al. (U.S. 2007/0253223) is achieved through adjusting phase differences of the interleaved PFC circuit, which attempts to counteract discrepancies of the interleaved phases. However, this technique fails to address the accuracy issues of the sampling circuits and is only applicable to transition modes of a PFC circuit for low-power applications.

SUMMARY OF THE INVENTION

To overcome the problems described above, preferred embodiments of the present invention provide improved current sharing among phases of an interleaved PFC circuit by counteracting deteriorated accuracy, resolution, and characteristic drift of current sampling circuits through self-tuning regulation, especially under light-load conditions.

Through self-tuning regulation, preferred embodiments of the present invention make current-balancing control immune to characteristic variations, drifts, and resolution issues of sampling circuits of interleaved PFC circuits, without any hardware changes or control gain changes.

Usually a sampling circuit mainly includes current transformers or shunt resistors, signal amplifiers, and analog-digital converters (ADC), etc. Components of the sampling circuit impacts sampling accuracy and resolution, which deteriorate when currents are small. When inaccurate sampled currents are input into current controllers, incorrect control outputs are obtained, which results in unbalanced currents. The preferred embodiments of the present invention can include an interleaved PFC circuit with a self-tuning regulator that improves current sharing performance by counteracting inaccurate sampling under light-load conditions.

According to a preferred embodiment of the present invention, a regulator for a power factor correction circuit includes adjuster circuitry that determines a duty cycle adjustment; judge circuitry that determines whether to activate the adjuster circuitry; distributor circuitry that determines tuned duty cycles based on input duty cycles and the duty cycle adjustment; and tuner circuitry that tunes sampling instants of average inductor currents in first and second phases of the power factor correction circuit based on the tuned duty cycles.

Preferably, the adjuster circuitry determines the duty cycle adjustment by inputting a duty cycle difference between a first duty cycle of a first transistor in a first sub-circuit and a second duty cycle of a second transistor in a second sub-circuit to a proportional integrator (PI). Preferably, the distributor circuitry subtracts the duty cycle adjustment from half of one of a first duty cycle and a second duty cycle to obtain a first tuned duty cycle; adds the duty cycle adjustment to half of the other one of the first duty cycle and the second duty cycle to obtain a second tuned duty cycle; and transmits the first tuned duty cycle and the second tuned duty cycle to the tuner circuitry. Preferably, the tuner circuitry determines sampling instants by multiplying both of a first tuned duty cycle and a second tuned duty cycle by a switching period; and samples currents in the first sub-circuit and in the second sub-circuit at the determined sampling instants.

According to a preferred embodiment of the present invention, a power factor correction circuit includes a regulator according to various other preferred embodiments of the present invention; an input voltage; a rectifier that rectifies the input voltage; a first sub-circuit including the first inductor, a first transistor, a first current sensor, and a first diode; a second sub-circuit including the second inductor, a second transistor, a second current sensor, and a second diode; and a capacitor connected to the first and second sub-circuits and connected to a positive terminal and a negative terminal of a direct current voltage output.

Each of the first and second current sensors preferably is a transformer. The judge circuitry preferably activates the adjuster circuitry: if average currents of the first and second inductors are less than or equal to a threshold value; and if a first current in the first inductor is less than or equal to a difference between a second current in the second inductor and a predetermined inductor current value, and a first duty cycle of the first transistor is greater than or equal to a sum of a second duty cycle of the second transistor and a predetermined duty cycle value; or if the first current in the first inductor is greater than or equal to a sum of the second current in the second inductor and the predetermined inductor current value, and the first duty cycle of the first transistor is less than or equal to a difference between the second duty cycle of the second transistor and the predetermined duty cycle value.

According to a preferred embodiment of the present invention, a method of regulating a power factor correction circuit includes regulating a difference between input duty cycles to determine duty cycle adjustment and then to determine tuned duty cycles for sampling average inductor currents of first and second sub-circuits; judging whether to activate the duty cycle adjustment; and tuning to determine tuned average inductor currents of first and second inductors in the power factor correction circuit based on tuned duty cycles.

According to a preferred embodiment of the present invention, a power factor correction circuit includes an input voltage; a diode rectifier connected to the input voltage; a first boost phase connected to the rectifier and including a first transistor, a first diode, and a first inductor; a second boost phase connected to the rectifier and including a second transistor, a second diode, and a second inductor; an output capacitor connected to the first and second boost phases; a current controller that outputs a first duty cycle $d_{sp1}$ to the first transistor, and a second duty cycle $d_{sp2}$ to the second transistor; a pulse width modulator that generates gating signals G1 and G2 with 180° phase shift for the first and second transistors based on duty cycles $d_{sp1}$ and $d_{sp2}$; and a self-tuning regulator that tunes average inductor currents $I_{L1}$ and $I_{L2}$ for the current controller by iteratively tuning sampling instants through a first tuned duty cycle $d_{pt1}$ and a second tuned duty cycle $d_{pt2}$ when the self-tuning regulator detects the two average inductor currents are unbalanced.

Preferably, the current controller determines the first duty cycle $d_{sp1}$ by regulating a difference between a tuned average inductor current in the first boost phase and a reference current through a first PI, and determines the second duty cycle $d_{sp2}$ by regulating the difference between a tuned average inductor current in the second boost phase and the reference current through a second PI.

Preferably, the self-tuning regulator determines the tuned average inductor current in the first boost phase and the tuned average inductor current in the second boost phase by tuning the sampling instants $d_{pt1}T_s$ and $d_{pt2}T_s$, which are products of tuned duty cycles $d_{pt1}$, $d_{pt2}$ and switching period $T_s$, respectively; and the self-tuning regulator iteratively adjusts the first tuned duty cycle $d_{pt1}$ and the second tuned duty cycle $d_{pt2}$ by: calculating a difference between the first duty cycle $d_{sp1}$ and the second duty cycle $d_{sp2}$ and transmitting the difference to a PI to obtain a duty cycle adjustment $\Delta d_{st}$; determining a tuned duty cycle $d_{pt1}$ of the first boost phase and a tuned duty cycle $d_{pt2}$ of the second boost phase based on:

$$d_{pt1} = \frac{d_{sp1}}{2} - \Delta d_{st} \quad (1)$$

$$d_{pt2} = \frac{d_{sp2}}{2} + \Delta d_{st}; \quad (2)$$

or $$d_{pt1} = \frac{d_{sp1}}{2} + \Delta d_{st} \quad (1')$$

$$d_{pt2} = \frac{d_{sp2}}{2} - \Delta d_{st}; \quad (2')$$

sampling currents in the first boost phase at instant $t_1 = d_{pt1}T_s$ and in the second boost phase at instant $t_2 = d_{pt2}T_s$, where $T_s$ is a sampling period; and updating the first duty cycle $d_{sp1}$ by regulating the difference between current sampled in the first boost phase at instant $t_1$ and the reference current through a PI of the current controller, and updating the second duty cycle $d_{sp2}$ by regulating the difference between current sampled in the second boost phase at instant $t_2$ and the same reference current through another PI of the current controller.

Preferably, the self-tuning regulator iteratively adjusts the first tuned duty cycle $d_{pt1}$ and the second tuned duty cycle $d_{pt2}$ only if: both a first average inductor current $I_{L1}$ in the first boost phase and a second average inductor current $I_{L2}$ in the second boost phase are less than or equal to a threshold current $I_{th}$; and either:

$$I_{L1} \leq I_{L2} - \Delta I_L \text{ and } d_{sp1} \geq d_{sp2} + \Delta d \quad (3)$$

or $$I_{L1} \geq I_{L2} + \Delta I_L \text{ and } d_{sp1} \leq d_{sp2} - \Delta d \quad (4)$$

where $\Delta I_L$ and $\Delta d$ are predetermined values; and otherwise, the current controller does not iteratively adjust the first tuned duty cycle $d_{pt1}$ and the second tuned duty cycle $d_{pt2}$.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
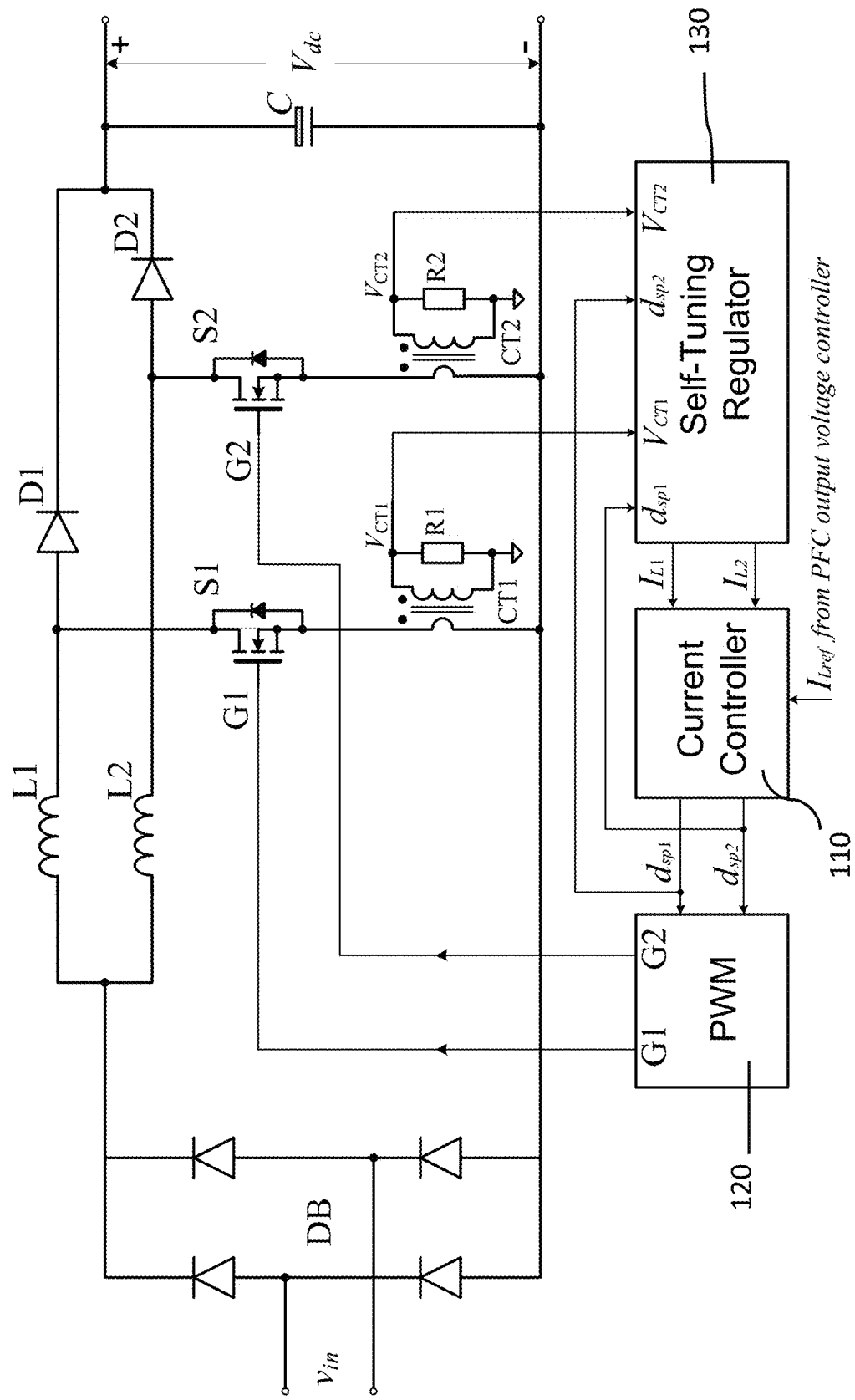
FIG. 1 shows an interleaved PFC circuit according to a preferred embodiment of the present invention.

As shown in FIG. 1, an interleaved PFC circuit can include two parallel-interleaved phases or sub-circuits with a shared output capacitor C. Each phase or sub-circuit can include one inductor Lx, one diode Dx, and one transistor Sx, where x=1 or 2 to indicate the phase or sub-circuit number. The input voltage $v_{in}$, which can be alternating current (AC) or direct current (DC), is connected to the interleaved PFC circuit through a diode bridge DB, which converts the input voltage $v_{in}$ into unregulated direct current (DC) voltage. The interleaved PFC circuit then boosts the unregulated DC voltage to a desired regulated DC voltage $V_{dc}$. Although FIG. 1 shows an interleaved PFC circuit with two parallel-interleaved phases or sub-circuits with a shared output capacitor C, an interleaved PFC circuit with more than two parallel-interleaved phases is possible.

In FIG. 1, a self-tuning regulator processes outputs of current transformers, $V_{CT1}$ and $V_{CT2}$, and outputs of the current controllers, i.e., duty cycles $d_{sp1}$ and $d_{sp2}$, to determine tuned average inductor currents $I_{L1}$ and $I_{L2}$. The tuned currents $I_{L1}$ and $I_{L2}$ and the current reference $I_{tref}$, which is generated by the PFC output voltage controller, are transmitted to the current controller 110. After which, the duty cycles $d_{sp1}$ and $d_{sp2}$ are obtained and transmitted to the pulse width modulator (PWM) circuit 120 to generate gating signals $G_1$ and $G_2$ that control the on and off switching of transistors $S_1$ and $S_2$. The self-tuning regulator 130, the current controller 110, and the PWM circuit 120 are implemented together in a single microcontroller, although other configurations are possible. For example, each could be implemented in separate microcontrollers or ICs. Any suitable microcontroller can be used.

As shown in FIG. 1, the transistors $S_1$ and $S_2$ can be metal-oxide-semiconductor field-effect transistors (MOS-FET). That is, currents flowing through transistors S1 and S2 can be sensed by corresponding current transformers CT1 and CT2 that are connected to the source terminals, each with a corresponding sensing resistor R1 and R2 that converts currents into voltages $V_{CT1}$ and $V_{CT2}$. Alternatively, the current transformers CT1 and CT2 could be connected to the drains of the transistor S1 and S2, or to the branches of inductor L1 and L2, and the current transformers CT1 and CT2 can be replaced with shunt resistors or current transducers using the Hall Effect to measure the current.

Figure 2:
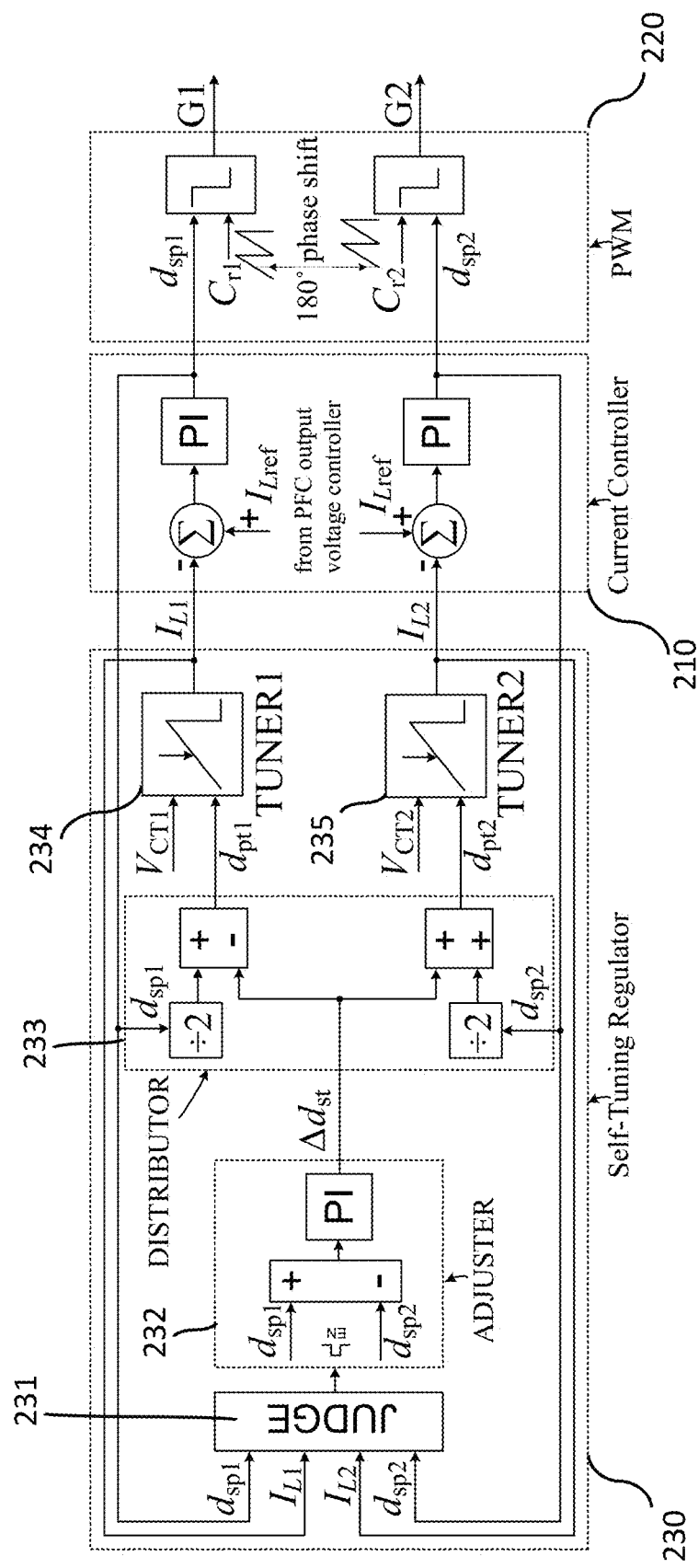
FIG. 2 shows a self-tuning regulator circuit, a current controller, and a pulse width modulator according to a preferred embodiment of the present invention.

FIG. 2 shows a self-tuning regulator 230, a current controller 210, and a PWM circuit 220, which can be used with the interleaved PFC circuit of FIG. 1. After receiving duty cycles $d_{sp1}$ and $d_{sp2}$ and averaged inductor currents $I_{L1}$ and $I_{L2}$, the JUDGE circuit 231 will determine whether to activate or enable the following ADJUSTER circuit 232 to determine a duty cycle adjustment $\Delta d_{st}$. In the DISTRIBUTOR circuit 233 following the ADJUSTER circuit 232, the duty cycle adjustment is added to or subtracted from half of the duty cycles $d_{sp1}/2$ and $d_{sp2}/2$, respectively, to determine tuned duty cycles $d_{pt1}$ and $d_{pt2}$ for following TUNER1 234 and TUNER2 235. Based on tuned duty cycles, TUNER1 234 and TUNER2 235 can decide instants to sample outputs of current transformers $V_{CT1}$ and $V_{CT2}$, then the tuned average inductor currents $I_{L1}$ and $I_{L2}$ can be obtained. The JUDGE circuit 231, ADJUSTER circuit 232, TUNER1 234, and TUNER2 235 of the self-tuning regulator 230 shown in FIG. 2 can all be implemented together in a single microcontroller. But other configurations are also possible.

As shown in FIG. 2, the self-tuning regulator 230 includes a JUDGE circuit 231, an ADJUSTER circuit 232, a DISTRIBUTOR circuit 233, a TUNER1 circuit 234, and a TUNER2 circuit 235. The JUDGE circuit 231 determines if it is necessary to activate or enable the following ADJUSTER circuit 232 after receiving the average inductor currents $I_{L1}$ and $I_{L2}$ and the duty cycles $d_{sp1}$ and $d_{sp2}$ as inputs.

Figure 3:
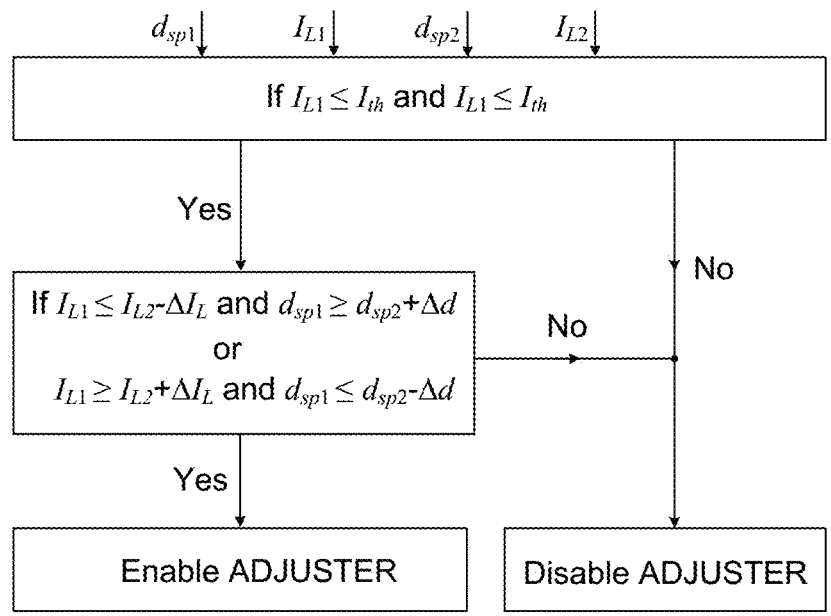
FIG. 3 shows an example implementation diagram of the JUDGE circuit of FIG. 2 according to a preferred embodiment of the present invention.

FIG. 3 shows an exemplary implementation of the JUDGE circuit 231 of FIG. 2. In the top block, after receiving the average inductor currents $I_{L1}$ and $I_{L2}$ and the duty cycles $d_{sp1}$ and $d_{sp2}$ as inputs, the JUDGE circuit 231 determines if the average inductor currents $I_{L1}$ and $I_{L2}$ are less than a threshold current value $I_{th}$, which is an average inductor current value when the PFC circuit of FIG. 1 operates at boundary conditions. Under boundary conditions, the PFC inductor current starts from zero at the beginning of every switching cycle, and ends at zero at the ending of every switching cycle. Thus, when average inductor current is greater than a threshold value, the PFC will operate in continuous modes. Otherwise, when the average inductor current is less than the threshold value, the PFC will operate in discontinuous modes. If both inductor currents $I_{L1}$ and $I_{L2}$ are less than or equal to the threshold current $I_{th}$, then the JUDGE circuit 231 determines whether conditions (1) or (2) below are met, where $\Delta I_L$ and $\Delta d$ are predetermined values for hysteresis to avoid activating and deactivating (or enabling and disabling) the ADJUSTER circuit 232 frequently around the boundary points:

$$I_{L1} \le I_{L2} - \Delta I_L \text{ and } d_{sp1} \ge d_{sp2} + \Delta d \quad (1)$$

$$I_{L1} \ge I_{L2} + \Delta I_L \text{ and } d_{sp1} \le d_{sp2} - \Delta d \quad (2)$$

The specific values for $\Delta I_L$ and $\Delta d$ depend on the precision requirements of the current sharing control and the resolution of the sampling circuits.

If at least one of conditions (1) and (2) is met, then the JUDGE circuit 231 activates or enables the ADJUSTER circuit 232. If both currents $I_{L1}$ and $I_{L2}$ are greater than the threshold current $I_{th}$, or if both conditions (1) and (2) are not met, then the JUDGE circuit 231 disables the ADJUSTER circuit 232.

Once activated or enabled, the ADJUSTER circuit 232 uses a PI (shown in FIG. 2) to control the difference between duty cycles $d_{sp1}$ and $d_{sp2}$, to obtain a duty cycle adjustment $\Delta d_{st}$, which is then passed to the DISTRIBUTOR circuit 233, where it is respectively subtracted from and added to half of $d_{sp1}$ and $d_{sp2}$, as shown in formulas (3) and (4) below, to determine the tuned duty cycles $d_{pt1}$ and $d_{pt2}$.

$$d_{pt1} = \frac{d_{sp1}}{2} - \Delta d_{st} \quad (3)$$

$$d_{pt2} = \frac{d_{sp2}}{2} + \Delta d_{st} \quad (4)$$

Alternatively, the tuned duty cycles $d_{pt1}$ and $d_{pt2}$ can be calculated using formulas (3') and (4') below.

$$d_{pt1} = \frac{d_{sp1}}{2} + \Delta d_{st} \quad (3')$$

$$d_{pt2} = \frac{d_{sp2}}{2} - \Delta d_{st} \quad (4')$$

Once determined, the two tuned duty cycles $d_{pt1}$ and $d_{pt2}$ are respectively transmitted to the TUNER1 234 and the TUNER2 235 of the TUNER circuit of the self-tuning regulator 230, together with voltage outputs $V_{CT1}$, $V_{CT2}$ of transformers CT1 and CT2, to tune the sampling instants $d_{pt1} T_s$ and $d_{pt2}T_s$, where $T_s$ is the switching period, to correct the sampling inaccuracies of the sampling circuits, and therefore improve the current sharing performance of the phases of the PFC circuit.

As shown in FIG. 1, the sampling circuits can include current transformers, sampling resistors, and analog-to-digital converters (ADC), which are not shown in the self-turning regulator 130.

As shown in FIG. 2, the tuned average inductor currents $I_{L1}$ and $I_{L2}$ of the TUNER 1 234 and the TUNER 2 235 circuits are compared with the current reference $I_{tref}$, which is outputted from the PFC output voltage controller, and the differences between them ($I_{tref}$-$I_{L1}$, $I_{tref}$-$I_{L2}$) are transmitted to the following two PIs to update the duty cycles $d_{sp1}$ and $d_{sp2}$, respectively. The updated duty cycles $d_{sp1}$ and $d_{sp2}$ are then transmitted to the PWM circuit, to generate gating signals for switches S1 and S2 of the interleaved PFC to make the difference between $I_{L1}$ and $I_{L2}$ smaller, so that the current sharing can be improved. This self-tuning process is iterative until neither (1) or (2) is met and the JUDGE circuit 231 disables the ADJUSTER circuit 232.

If the ADJUSTER circuit 232 is disabled, then the duty cycle adjustment $\Delta d_{st}$ remains the same as that obtained at the last moment when the ADJUSTER circuit 232 was still activated or enabled, and no self-tuning regulation is performed.

Figure 4:
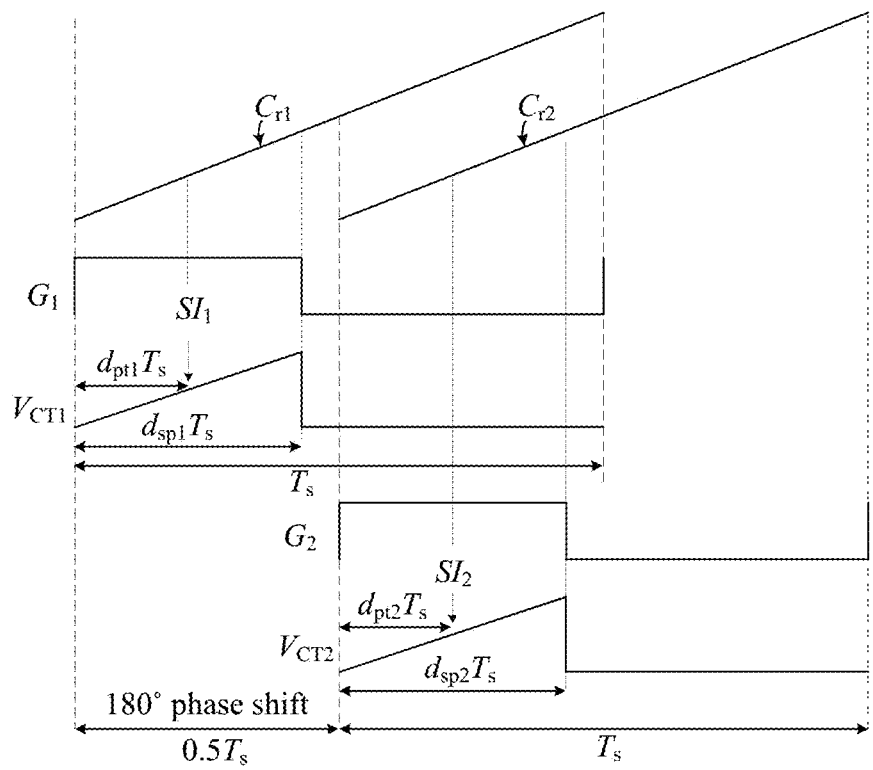
FIG. 4 shows an example implementation diagram for the TUNER circuit of FIG. 2 according to a preferred embodiment of the present invention.

In the implementation diagram for the TUNER circuits 1, 2 in FIG. 4, sampling instants $Sl_1$ and $Sl_2$ are determined by multiplying the tuned duty cycles $d_{pt1}$, $d_{pt2}$ and the switching period $T_s$, i.e., $d_{pt1}T_s$ and $d_{pt2} T_s$. The 1800 phase-shifted sawtooth carriers $C_{r1}$ and $C_{r2}$ are generated by circuits or dedicated microchips. In tuning the duty cycles $d_{pt1}$ and $d_{pt2}$ using formulas (3) and (4), the sampling instants $Sl_1$ and $Sl_2$ will vary within a range of half of a duty cycle by the adjustment $\Delta d_{st}$, unlike conventional methods where the sampling instants are fixed at half of the duty cycles.

Figure 5:
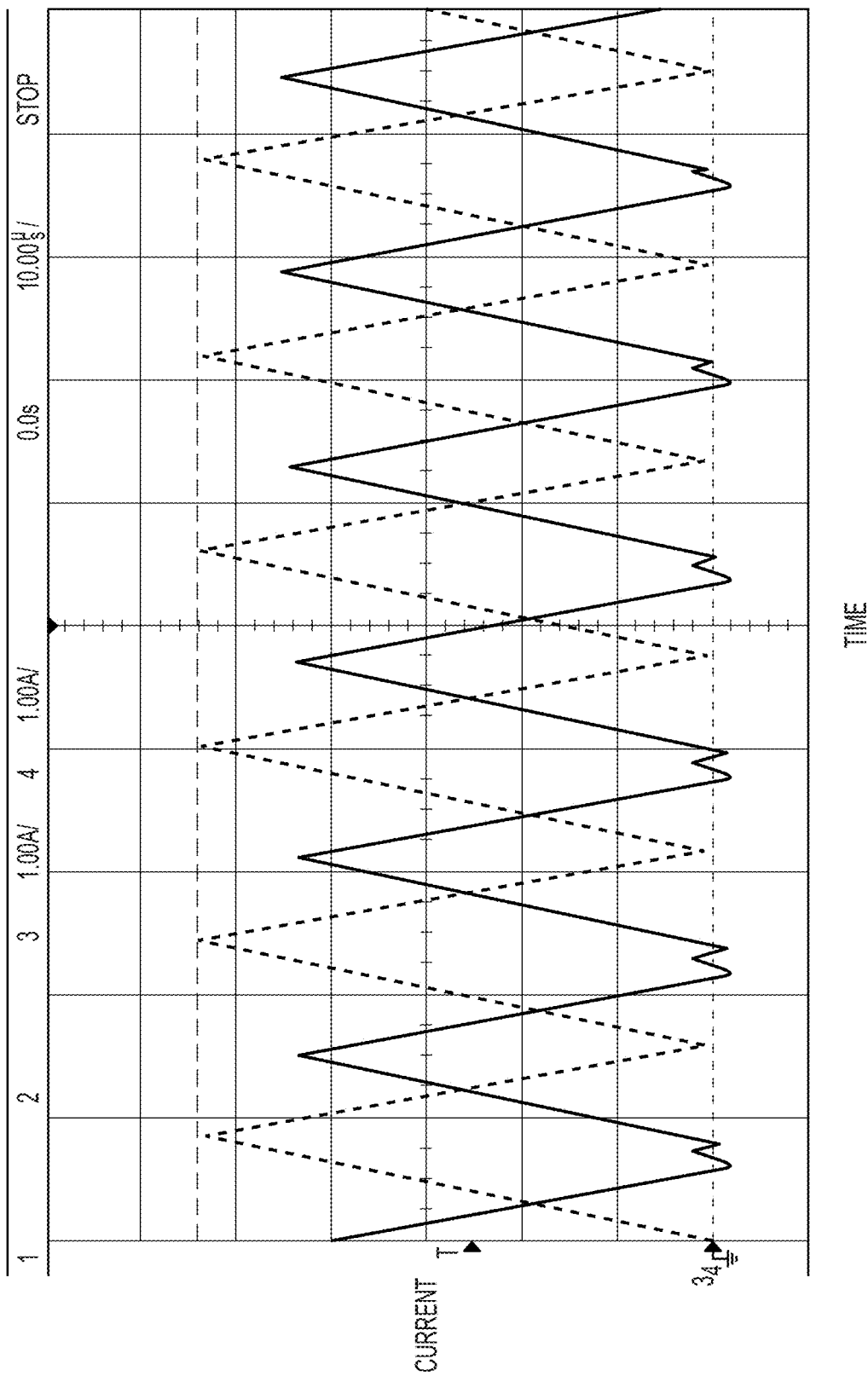
FIG. 5 shows inductor currents of an interleaved PFC circuit before implementing self-tuning regulation.
Figure 6:
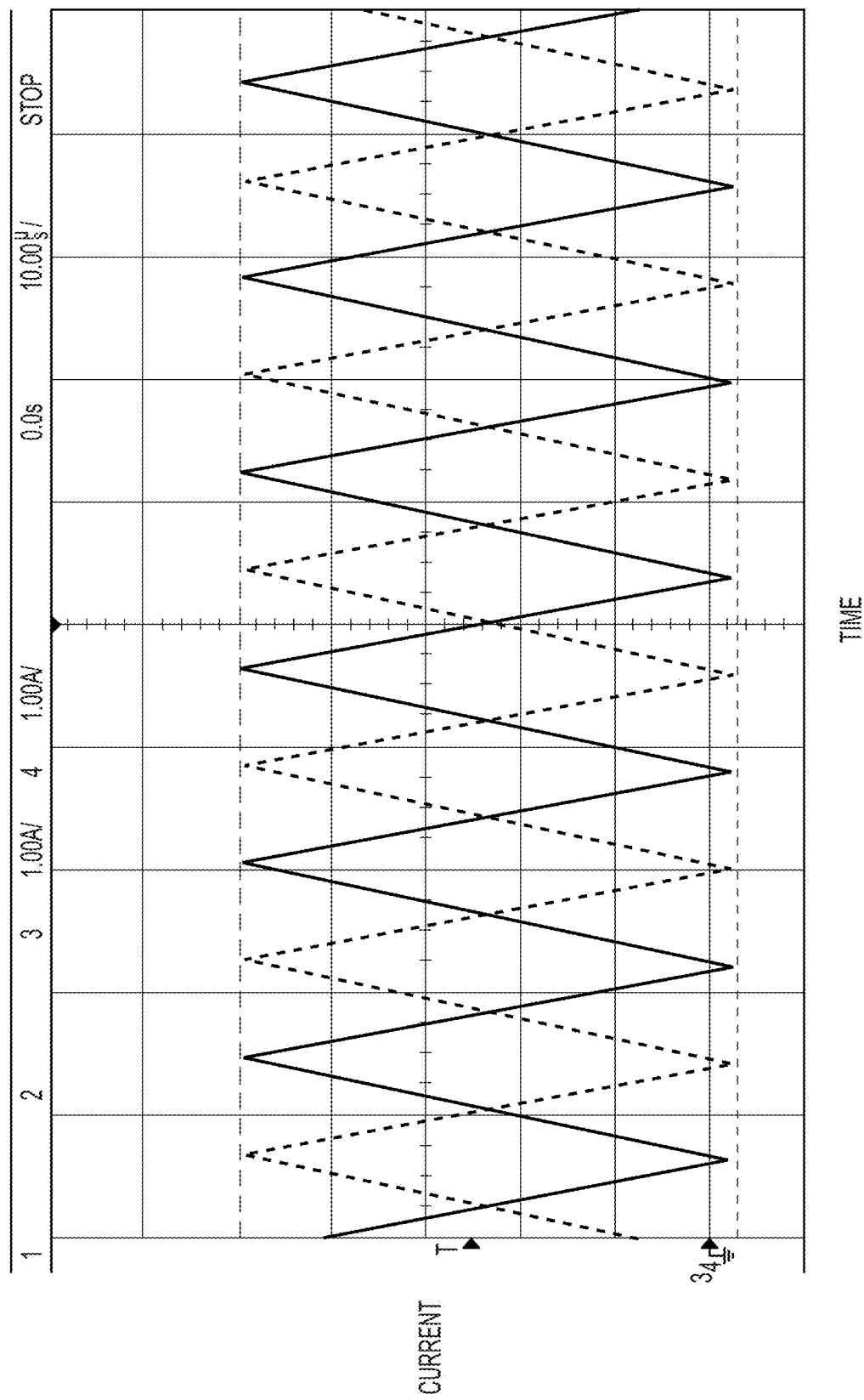
FIG. 6 shows inductor currents of an interleaved PFC circuit after implementing self-tuning regulation according to a preferred embodiment of the present invention.
Figure 7:
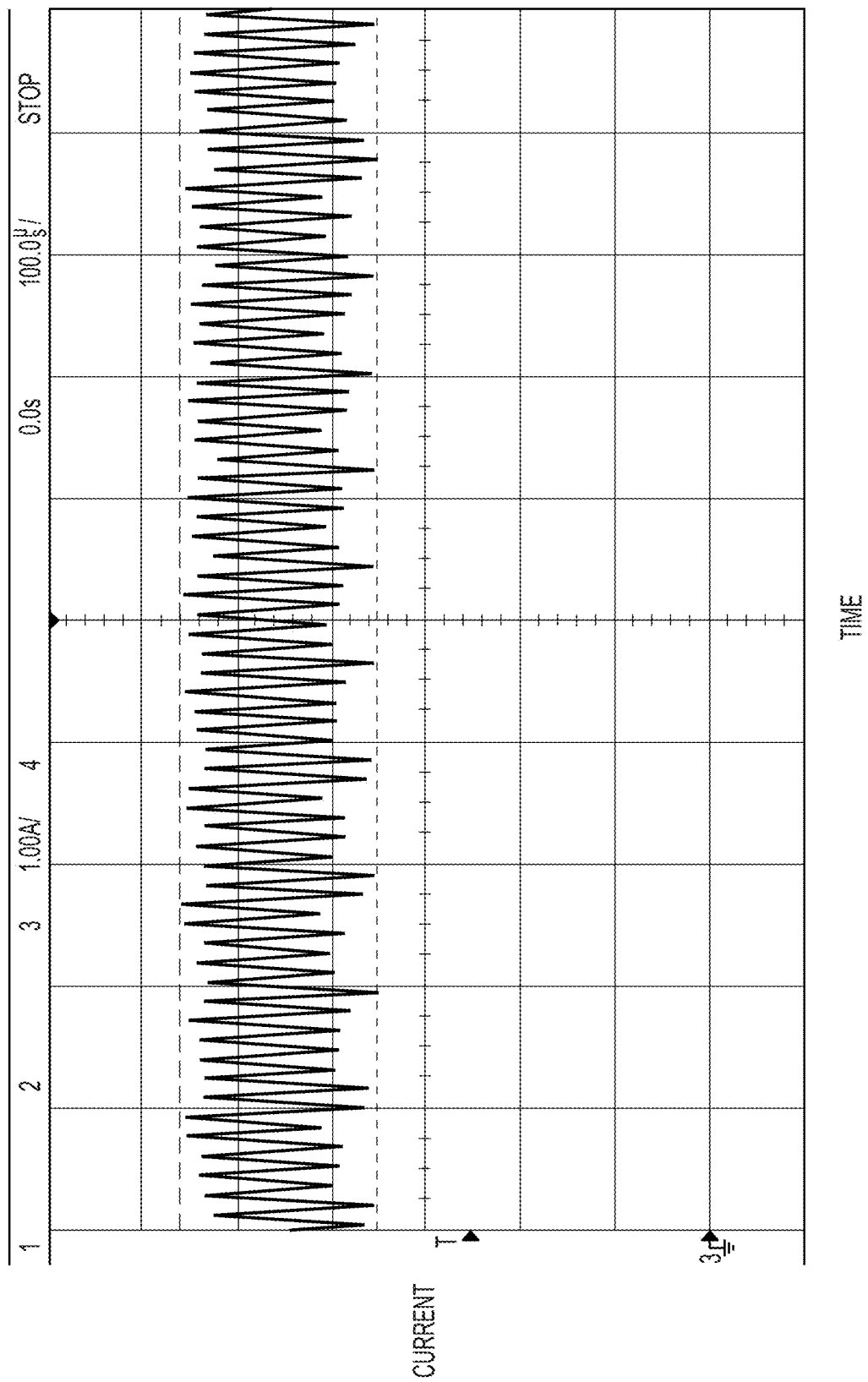
FIG. 7 shows total input current of an interleaved PFC circuit before implementing self-tuning regulation.
Figure 8:
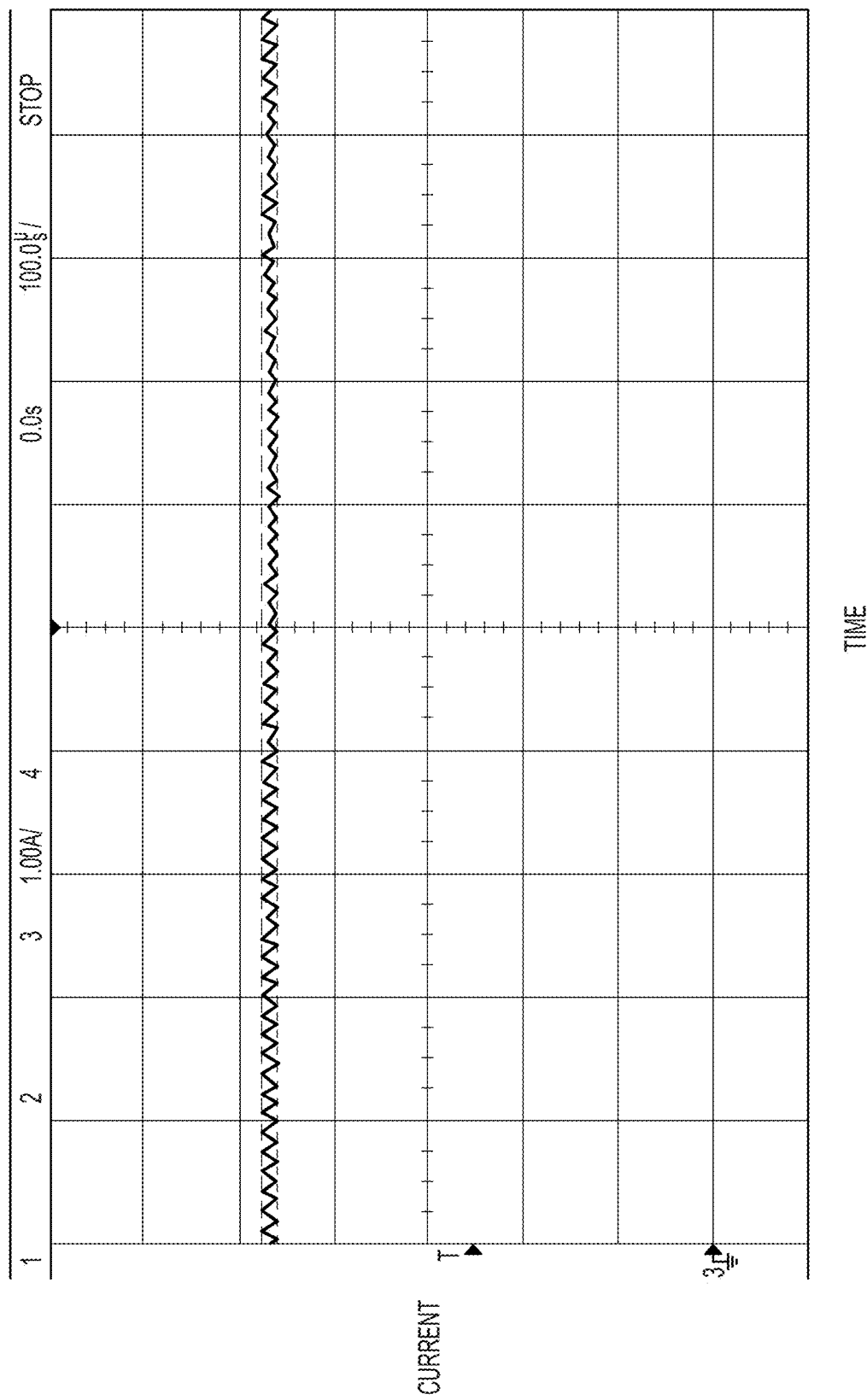
FIG. 8 shows total input current of an interleaved PFC circuit after implementing self-tuning regulation according to a preferred embodiment of the present invention.

The performance of the self-tuning regulator for the interleaved PFC circuit has been verified through experiments, where the input voltage is chosen to be DC. As shown in FIG. 5, the inductor currents of two inductors in an interleaved PFC circuit are unbalanced before the self-tuning regulation is implemented. The inductor currents become well balanced after implementing the self-tuning regulation, as shown in FIG. 6. FIGS. 7 and 8, respectively, show total input currents of an interleaved PFC circuit before and after implementing self-tuning regulation. In comparing the total input currents of FIGS. 7 and 8, it is shown that with self-tuning regulation, the peak-to-peak ripple of the total input current of an interleaved PFC circuit can be greatly reduced from about 45% to about 3.2% of the average value.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A regulator for a power factor correction circuit, the regulator comprising:
adjuster circuitry that determines a duty cycle adjustment;
judge circuitry that determines whether to activate the adjuster circuitry;
distributor circuitry that determines tuned duty cycles based on input duty cycles and the duty cycle adjustment; and
tuner circuitry that tunes sampling instants of average inductor currents in first and second phases of the power factor correction circuit based on the tuned duty cycles.

2. The regulator of claim 1, wherein the adjuster circuitry determines the duty cycle adjustment by inputting a duty cycle difference between a first duty cycle of a first transistor in a first sub-circuit and a second duty cycle of a second transistor in a second sub-circuit to a proportional integrator.

3. The regulator of claim 1, wherein the distributor circuitry:
subtracts the duty cycle adjustment from half of one of a first duty cycle and a second duty cycle to obtain a first tuned duty cycle;
adds the duty cycle adjustment to half of the other one of the first duty cycle and the second duty cycle to obtain a second tuned duty cycle; and
transmits the first tuned duty cycle and the second tuned duty cycle to the tuner circuitry.

4. The regulator of claim 1, wherein the tuner circuitry:
determines sampling instants of inductor currents by multiplying both of a first tuned duty cycle and a second tuned duty cycle by a switching period; and
samples inductor currents in the first sub-circuit and in the second sub-circuit at the determined sampling instants.

5. A power factor correction circuit comprising:
the regulator of claim 1;
an input voltage;
a rectifier that rectifies the input voltage;
a first sub-circuit including a first inductor, a first transistor, a first current sensor, and a first diode;
a second sub-circuit including a second inductor, a second transistor, a second current sensor, and a second diode; and
a capacitor connected to the first and the second sub-circuits and connected to a positive terminal and a negative terminal of a direct current voltage output.

6. The power factor correction circuit of claim 5, wherein each of the first and the second current sensors is a transformer.

7. The power factor correction circuit of claim 5, wherein the judge circuitry activates the adjuster circuitry:
if average currents of the first and second inductors are less than or equal to a threshold value; and
if a first current in the first inductor is less than or equal to a difference between a second current in the second inductor and a predetermined inductor current value, and a first duty cycle of the first transistor is greater than or equal to a sum of a second duty cycle of the second transistor and a predetermined duty cycle value; or
if the first current in the first inductor is greater than or equal to a sum of the second current in the second inductor and the predetermined inductor current value, and the first duty cycle of the first transistor is less than or equal to a difference between the second duty cycle of the second transistor and the predetermined duty cycle value.

8. A method of regulating a power factor correction circuit, the method comprising:
regulating a difference between input duty cycles to determine a duty cycle adjustment and then to determine tuned duty cycles for sampling average inductor currents of first and second sub-circuits;
judging whether to activate the duty cycle adjustment; and
tuning to determine tuned average inductor currents of first and second inductors in the power factor correction circuit based on the tuned duty cycles.

9. A power factor correction circuit comprising:
input voltage terminals;
a diode rectifier connected to the input voltage terminals;
a first boost phase connected to the diode rectifier and including a first transistor, a first diode, and a first inductor;
a second boost phase connected to the diode rectifier and including a second transistor, a second diode, and a second inductor;
an output capacitor connected to the first and second boost phases;
a current controller that generates a first duty cycle ($d_{sp1}$) for the first transistor, and generates a second duty cycle ($d_{sp2}$) for the second transistor based on tuned average inductor current signals ($I_{L1}$) and ($I_{L2}$);
a pulse width modulator that generates gating signals (G1 and G2) with 180° phase shift for the first and second transistors based on duty cycles ($d_{sp1}$ and $d_{sp2}$); and
a self-tuning regulator that iteratively tunes sampling instants through a first tuned duty cycle ($d_{pt1}$) and a second tuned duty cycle ($d_{pt2}$) to obtain the tuned average inductor currents ($I_{L1}$ and $I_{L2}$) for the current controller, when the self-tuning regulator detects the average inductor currents ($I_{L1}$ and $I_{L2}$) are unbalanced.

10. The power factor correction circuit of claim 9, wherein the current controller:
determines the first duty cycle ($d_{sp1}$) by regulating a difference between a tuned average inductor current in the first boost phase and a reference current through a first proportional integrator; and
determines the second duty cycle ($d_{sp2}$) by regulating the difference between a tuned average inductor current in the second boost phase and the reference current through a second proportional integrator.

11. The power factor correction circuit of claim 9, wherein:
the self-tuning regulator determines the tuned average inductor current in the first boost phase and the tuned average inductor current in the second boost phase by tuning the sampling instants ($d_{pt1}T_s$ and $d_{pt2}T_s$), which are products of tuned duty cycles ($d_{pt1}$, $d_{pt2}$) and switching period ($T_s$), respectively; and the self-tuning regulator iteratively adjusts the first tuned duty cycle ($d_{pt1}$) and the second tuned duty cycle ($d_{pt2}$) by:
calculating a difference between the first duty cycle ($d_{sp1}$) and the second duty cycle ($d_{sp2}$) and transmitting the difference to a proportional integrator to obtain a duty cycle adjustment ($\Delta d_{st}$);
determining a tuned duty cycle ($d_{pt1}$) of the first boost phase and a tuned duty cycle ($d_{pt2}$) of the second boost phase based on:

$$d_{pt1} = \frac{d_{sp1}}{2} - \Delta d_{st} \quad (1)$$

$$d_{pt2} = \frac{d_{sp2}}{2} + \Delta d_{st}; \quad (2)$$

or $$d_{pt1} = \frac{d_{sp1}}{2} + \Delta d_{st} \quad (1')$$

$$d_{pt2} = \frac{d_{sp2}}{2} - \Delta d_{st}; \quad (2')$$

sampling currents in the first boost phase at instant $t_1 = d_{pt1}T_s$ and in the second boost phase at instant $t_2 = d_{pt2}T_s$, where $T_s$ is a sampling period; and
updating the first duty cycle ($d_{sp1}$) by regulating the difference between current sampled in the first boost phase at instant $t_1$ and the reference current through a proportional integrator of the current controller, and updating the second duty cycle ($d_{sp2}$) by regulating the difference between current sampled in the second boost phase at instant ($t_2$) and the same reference current through another proportional integrator of the current controller.

12. The power factor correction circuit of claim 9, wherein
the self-tuning regulator iteratively adjusts the first tuned duty cycle ($d_{pt1}$) and the second tuned duty cycle ($d_{pt2}$) only if:
both a first average inductor current ($I_{L1}$) in the first boost phase and a second average inductor current ($I_{L2}$) in the second boost phase are less than or equal to a threshold current ($I_{th}$); and
either:

$$I_{L1} \leq I_{L2} - \Delta I_L \text{ and } d_{sp1} \geq d_{sp2} + \Delta d \quad (3)$$

or $$I_{L1} \geq I_{L2} + \Delta I_L \text{ and } d_{sp1} \leq d_{sp2} - \Delta d \quad (4)$$

where $\Delta I_L$ and $\Delta d$ are predetermined values; and
otherwise, the self-tuning regulator does not iteratively adjust the first tuned duty cycle ($d_{pt1}$) and the second tuned duty cycle ($d_{pt2}$).

* * * * *